United States Patent [19]
Girauldon

[11] 3,734,243
[45] May 22, 1973

[54] COMPOSITE CALIPER FOR A DISC BRAKE

[75] Inventor: Jean-Claude Girauldon, Ponthierry, France

[73] Assignee: Societe Anonyme D.B.A.

[22] Filed: Mar. 18, 1971

[21] Appl. No.: 125,654

[30] Foreign Application Priority Data

Mar. 25, 1970 France.................................7010686

[52] U.S. Cl.................188/72.4, 92/161, 287/103 A, 188/73.3, 188/370
[51] Int. Cl..............................................F16d 65/32
[58] Field of Search...................188/73.3, 72.4, 72.5, 188/73.6, 370; 92/146, 161; 281/103 A

[56] References Cited

UNITED STATES PATENTS 3,548,973  12/1970  Laverdant.........................188/72.5
2,989,002  6/1961  Dobkin..............................92/161 X
2,526,998  10/1950  Davis............................287/103 A X

FOREIGN PATENTS OR APPLICATIONS 1,193,713  5/1959  France...............................188/72.5

*Primary Examiner*—George E. A. Halvosa
*Attorney*—W. N. Antonis and Plante, Hartz, Smith & Thompson

[57] ABSTRACT

A disc brake for an automotive vehicle in which a two-piece caliper assembly is used. The first piece is the caliper body including the bridge portion that straddles the disc and is secured to a pair of arms that extend outwardly from the bridge portion, thereby forming a U-shaped member presenting an open-end between the arms. The second piece is a brake actuator including piston means slidable in a cylinder having circular lugs that are received in circular grooves formed in the arms.

5 Claims, 6 Drawing Figures

Patented May 22, 1973

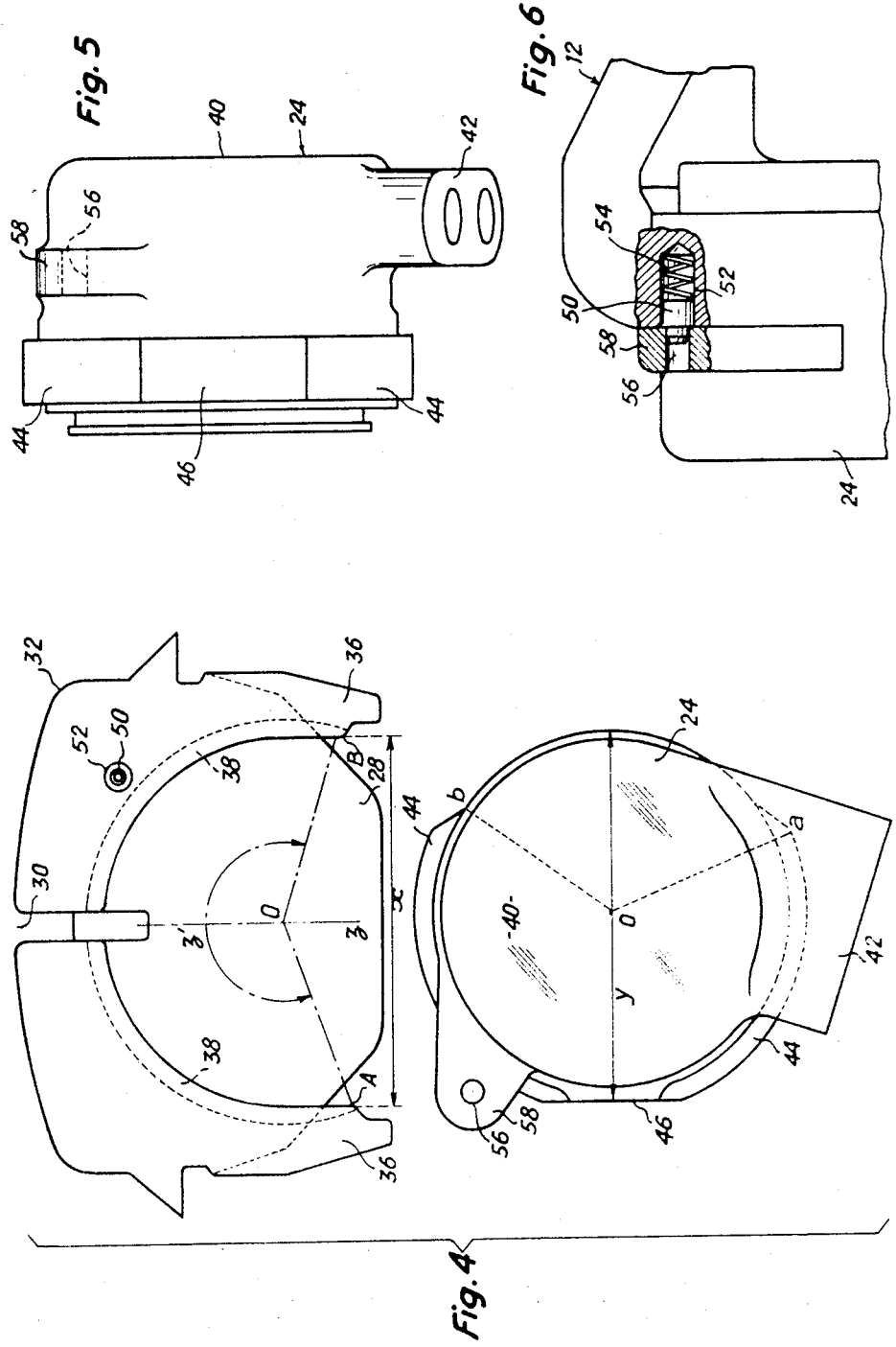

COMPOSITE CALIPER FOR A DISC BRAKE

The present invention relates to a disc brake and in particular to a caliper assembly for a disc brake either of floating or fixed type, said assembly comprising the caliper proper and one or more braking actuators. The invention is particularly useful in applications wherein the caliper is a "composite caliper".

A caliper composed of interconnected members made of various materials is called a "composite caliper" and the advantages presented by such composite calipers with respect to the one-piece calipers are well-known, for instance the machining steps can be chosen more specifically respectively for the brake actuator and for the body of the caliper. Furthermore, in a composite caliper it is possible to make the braking actuator cylinder of aluminum or of a light alloy easy to machine and having good heat conductivity characteristics and to make the body of the caliper of a ferrous alloy having a good mechanical resistance particularly with respect to tensile strength.

With a view to connecting the brake cylinder with the body of the caliper, it has been suggested to use studs or screws, the tightening of the studs or of the screws ensuring the rigid connection of the parts of the composite caliper.

In these known devices, high stresses are generated in said screws or studs due to the differential expansion resulting from the heating during the braking operation, said screws or studs being generally submitted to shearing stresses upon the application of the braking pressure to the brake cylinders.

There has also been proposed a disc brake wherein at least one of the actuator means is adapted to urge at least one of the friction pads towards the disc, said actuator means being secured to the caliper body by means of two sliding joints comprising lugs provided on said actuator means fitting into grooves provided in said caliper body, said sliding joint extending parallely with respect to each other and substantially parallely to the plane of the disc.

Such a caliper assembly presents many advantages but cannot be totally machined on a transfer machine since the rectilinear grooves in the caliper body must be realized with a mill machine.

The invention proposes a disc brake having a pair of friction pads each disposed adjacent a respective friction face of a disc, and a caliper assembly consisting of a caliper body having arms extending from either side of a portion straddling the disc to form a generally U-shaped member which presents at least one open end, said arms supporting within said open end brake actuating means constituting essentially of a piston means slidable in a cylinder which cooperates with the caliper body to urge the friction pads against the disc, said cylinder being connected to the arms by means of a sliding joint comprising lugs fitting into grooves, said lugs projecting from the cylinder when said groves are formed in the arms and conversely, said sliding joint extending on a circular portion of the external wall of said cylinder and being coaxial thereto, and a corresponding portion provided on the open end of said arms.

According to another feature, the invention proposes a disc brake as hereinabove described wherein said grooves are defined by a portion of a circular slide provided in said open end of the arms and extending in a plane substantially parallel to the disc plane, said portion having a circular arc slightly higher than 180°, and two diametrally opposed lugs are provided on the external wall of said cylinder, said lugs being separated by recess portion provided on said external wall thereby permitting said cylinder to be introduced into said open end by a displacement substantially parallel to the axis of symmetry thereof and then to be rotated for engaging said lugs into said slide.

It would be understood that with such a disc brake the groove of the caliper body and the lugs on the cylinder can be easily turn-machined. It results therefrom a substantial cost-reduction.

The bayonet type assembly of the caliper is simple and sturdy. It permits a substantially perfect linkage between the caliper body and the cylinder, particularly if a slot is provided in the caliper body thereby permitting a resilient deformation of the latter.

Other features of the invention will appear in the following description taken with reference to the accompanying drawings in which:

FIG. 4 illustrates the respective position of the caliper body and the cylinder according to the invention before the introduction of the latter in said caliper body;

FIG. 5 is a lateral view of the cylinder illustrated in FIG. 4; and

FIG. 6 is a partially sectional view of a portion of the caliper assembly according to the invention showing the locking device between the caliper body and the cylinder.

Figure 1:
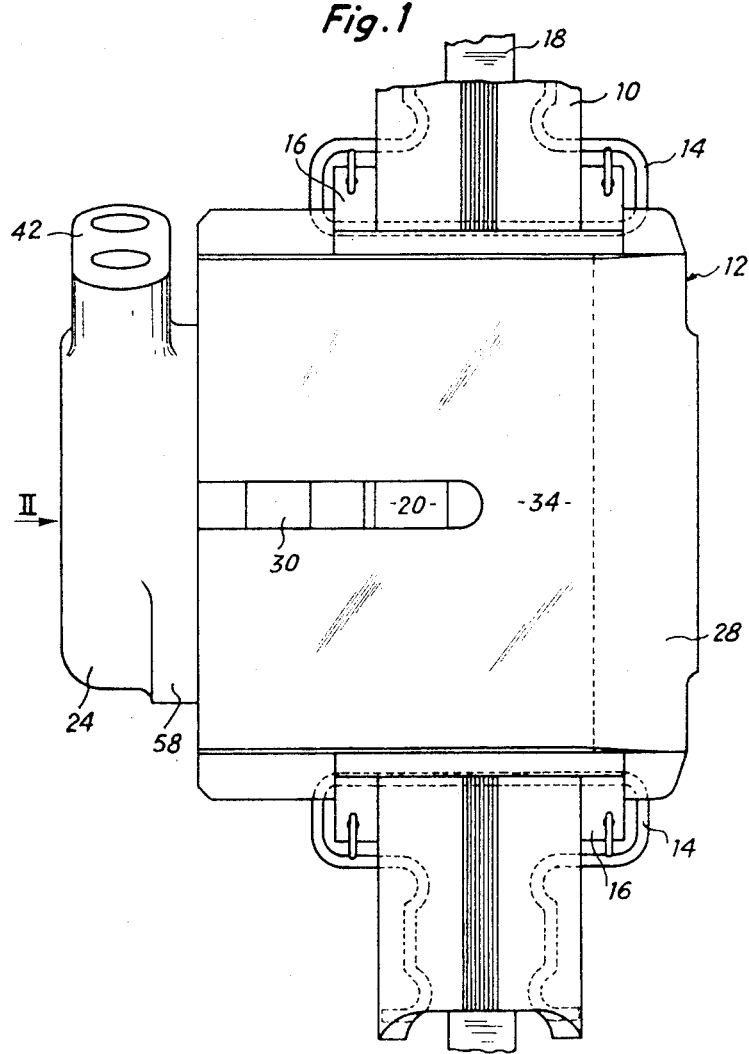
FIG. 1 is a plane view of a disc brake with a caliper assembly according to the invention.
Figure 2:
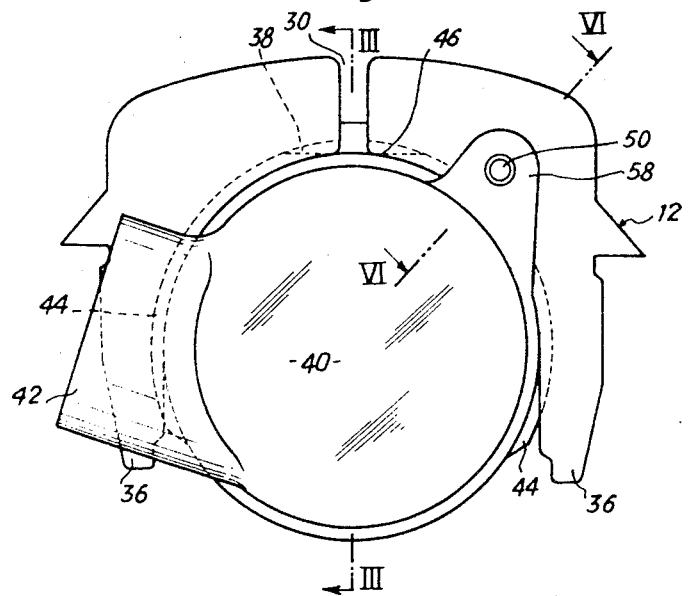
FIG. 2 is a view of the disc brake illustrated in FIG. 1 in the direction of the arrow II of FIG. 1.
Figure 3:
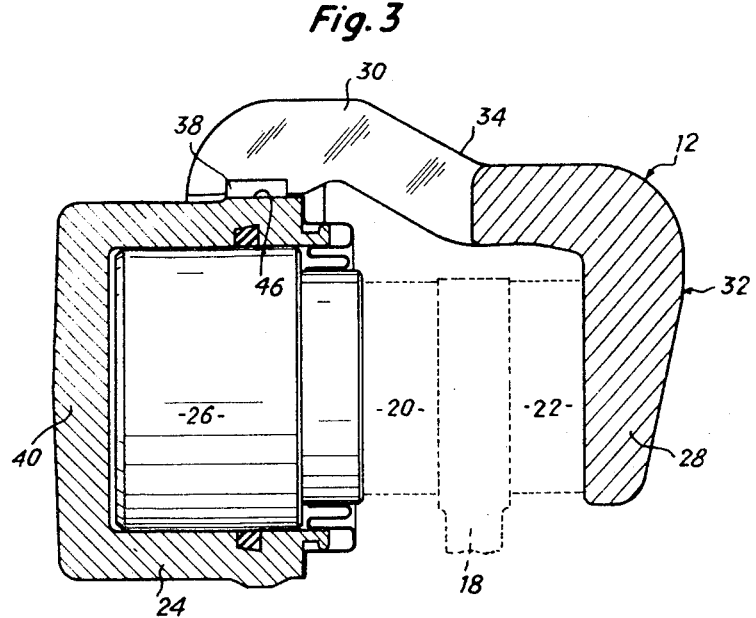
FIG. 3 is a sectional view of the caliper assembly illustrated in FIG. 2 upon the line III—III.

The disc brake shown in FIGS. 1, 2 and 3 comprises slidably mounted on a U-shaped fixed support 10 surrounding the disc, a caliper assembly 12 radially urged outwardly by spring 14. Key bolts 16 are inserted between support 10 and caliper assembly 12.

The caliper assembly 12 has a general shape of a double U-member straddling the disc 18. It causes the squeezing of the disc between the two pads 20 and 22 when braking liquid is introduced under pressure into the wheel cylinder on brake actuator 24. Pad 20 is applied against disc 18 by the displacement of the piston 26 in the cylinder of the actuator 24.

As illustrated in FIG. 1, pad 20 can only be seen through a slot 30 extending axially in the caliper central portion 34, the object of which will be discussed later. In FIG. 3 disc 18 appears between pads 20 and 22 illustrated by dotted lines. Naturally, during braking operation, the tangential stresses are transmitted through the pads 20 and 22 to the fixed support 10 not shown in FIG. 3 in a view to clarifying.

The caliper assembly according to the invention is now described and at the same time a particular method of assembly between the caliper body 32 and the cylinder 24. The cylinder side of the caliper assembly is shown in FIG. 2 and a sectional view of the caliper assembly upon the line III—III of the latter figure is illustrated in FIG. 3.

The upper portion of FIG. 4 shows the caliper body 32 of the caliper assembly 12, and the lower portion of the same figure shows the brake actuator 24.

The caliper body 32 comprises the central portion 34 straddling the disc 18 and the pads 20 and 22. One end of the central portion 34 is connected to a reaction portion 28, and the other end is provided with two arms extending parallely to the plane of the disc 18, and defining therebetween an open end adopted to receive the cylinder 24. A circular slide defining two grooves 38 is machined in the arms 36, said slide having a substantially constant section either square-shaped or half-circular-shaped for example. The grooves 38 extend upon a circular arc the center angle of which AOB is greater than 180° and preferably having a value of 220°. Cylinder 24 comprises in the vicinity of its base 40 a projection 42 in which two threaded bores are adapted to be connected with a conduit of a supply of brake fluid under pressure and with a bleeding device. The external wall of cylinder 24 is provided with two diametrically opposed lugs 44 defining a portion of a circular collar extending along an arc the angle aob of which is substantially equal to angle AOB. The two lugs 44 are located symmetrically with respect to a flat portion 46 which is tangential to cylinder 24.

The assembly of the caliper body 32 with the cylinder 24 is effected as follows:

Cylinder 24 is brought in front of the open end of the caliper body 32 as shown in FIG. 4, the centers O and o defined hereinabove being located on the axis of symmetry $zz'$ of the U-shaped open end of body 32. Cylinder 24 is oriented in such a manner that the flat portion 46 is parallel to axis $zz'$. Thanks to the presence of the flat portion 46 and the absence of lugs on the diametrically opposed portions between points $a$ and $b$, the diametrical overall size $y$ of the cylinder measured in a direction perpendicular to axis $zz'$ is slightly smaller than the distance $x$ between the ends A and B of the grooves 38 provided in the open end. It is thus possible to introduce the cylinder into the open end until points $o$ and O are brought in registration by means of a displacement along the direction of axis $zz'$.

While the introduction is being effected, the lug 44 located between the flat portion 46 and point $b$ enters grooves 38 of arms 36. The wheel cylinder is thus rotated about its axis clockwise when considering the drawing to bring it in the position in which it is shown in FIG. 2. The rotation effected is of about 90° and brings the flat portion 46 to a position in which it is substantially perpendicular to the axis $zz'$.

After the mounting has been effected as described above, the cylinder is locked on the caliper body for instance by means of a screw threaded in one of the arms 36 the end of the screw engaging the wheel cylinder 24.

As shown in FIG. 6, a stepped piston or plunger 50 may also be used acting as a lock. The larger diameter portion of plunger 50 is slidably received in a bore 52 provided in body 32 of the caliper. A compression spring 54 located in the bore 52 urges plunger 50 to project by its smaller diameter portion into a bore 56 having a corresponding diameter which is machined in an ear 58 solid with the cylinder 24.

With a view to avoiding any rattle in the caliper assembly 32 due to the vibrations, the lugs 44 present maximal diametrical dimensions slightly larger than the maximal diametrical dimensions of the grooves 38, thereby obtaining a stressed assembly. During the machining of said lugs 44 and/or said grooves, the peripheral edges thereof can present variable radii thereby permitting a wedged assembly still more effective. The slot 30 provided in caliper body 32 permits a resilient deformation of the latter.

It would be understood that such an assembly does not reduce the tensile strength of the caliper during braking operation as the stresses are directed according to the axis of the wheel cylinder 24.

In a preferred embodiment, the wheel cylinders are made with aluminum or with light alloy and the caliper body is made with steel or with cast iron.

Furthermore, still according to the invention, the caliper assembly may be provided with several wheel cylinders and may be incorporated in fixed caliper disc brakes.

I claim:

1. In a disc brake:
a rotor having a pair of friction faces;
a pair of friction elements, one of said elements being disposed adjacent each of said friction faces;
a caliper assembly for urging said friction elements into braking engagement with their corresponding friction faces;
said caliper assembly including a bridge portion extending across the periphery of said rotor, a cylinder, and a piston slidably mounted in said cylinder, said bridge portion including a pair of arm members extending from one end of the latter in a plane generally parallel to the plane of said rotor, said arm members cooperating to define an arcuate recess between said arm members having a radial opening defined between the ends of said arm members, a circular slide provided in each of said arms extending circumferentially around said arcuate recess in a plane parallel to said rotor, a pair of lugs extending from the outer circumferential surface of said cylinder, said lugs being separated by recessed portions to permit said cylinder to be inserted radially into said arcuate recess through said radial opening whereupon said cylinder is rotated about the axis of the latter to engage the lugs with said circular slide;
said lugs extending through a total circular arc substantially equal to the circular arc of said slide, one of said recessed portions separating said lugs being a flat portion extending tangentially with respect to said cylinder to permit said cylinder to be inserted through said radial opening;
the peripheral edges of said grooves and said lugs presenting variable radii thereby obtaining slopes for wedging said cylinder in said arms during said rotation.

2. A disc brake according to claim 1, wherein the maximal diametrical dimensions of said lugs are slightly larger than the maximal diametrical dimensions of said grooves.

3. A disc brake according to claim 2 wherein the caliper body is slotted upon the plane of symmetry thereof thereby permitting a resilient deformation of said arms during said rotation.

4. A disc brake according to claim 3 wherein a locking device is provided between said caliper body and said cylinder.

5. A disc brake according to claim 3 wherein the locking device includes a plunger slidable in a bore provided in the caliper body, said plunger being yieldably urged into a recess provided in the cylinder or in radial projection thereof.

* * * * *